United States Patent [19]
Jarnagin et al.

[11] Patent Number: 4,957,394
[45] Date of Patent: Sep. 18, 1990

[54] METHOD AND APPARATUS FOR SUB-FLOOR COLLECTION AND DISPOSAL OF RADON GAS

[75] Inventors: Jerry Jarnagin; Dennis W. Dawson, both of Canton, Ill.

[73] Assignee: Radon Home Products, Inc., Canton, Ill.

[21] Appl. No.: 400,377

[22] Filed: Aug. 30, 1989

[51] Int. Cl.$^5$ ............................................... B09B 3/00
[52] U.S. Cl. ..................................... 405/128; 405/229
[58] Field of Search ...................... 405/53, 54, 59, 128, 405/229, 37

[56] References Cited

U.S. PATENT DOCUMENTS

| | | | |
|---|---|---|---|
| 4,298,294 | 11/1981 | Zimmerman | 405/37 |
| 4,678,369 | 7/1987 | Gläser | 405/53 X |
| 4,745,850 | 5/1988 | Bastian et al. | 405/128 X |
| 4,810,131 | 3/1989 | Turner | 405/53 X |
| 4,863,312 | 9/1989 | Cavalli | 405/128 |

OTHER PUBLICATIONS

"Radon Reduction Methods: A Homeowner's Guide," Enviromental Protection Agency, Aug., 1986 (OPA-86-005).

"Radon Reduction Techniques for Detached Houses: Technical Guidance," Enirnomental Protection Agency, Jun., 1986 (EPA/625/5-86/019).

"Radon Reduction Techniques for Detached Houses: Technical Guidance" (Second Edition), Enirnomental Protection Agency, Jan., 1988 (EPA/625/5-87/019).

*Primary Examiner*—Dennis L. Taylor
*Assistant Examiner*—J. Russell McBee
*Attorney, Agent, or Firm*—Bell, Seltzer, Park & Gibson

[57] ABSTRACT

This invention relates to an apparatus and method for collecting and removing noxious gases including radon gas for the soil proximate a basement or other enclosure to minimize any health hazards. The apparatus includes a fan situated outside the enclosure that draws the noxious gas from the soil proximate a basement and dispenses it harmlessly into the atmosphere. A collection chamber component of this invention may alternatively also include a pump for disposing of fluids which may also seep into the collection chamber.

14 Claims, 2 Drawing Sheets

METHOD AND APPARATUS FOR SUB-FLOOR COLLECTION AND DISPOSAL OF RADON GAS

FIELD OF THE INVENTION

This invention relates generally to the collection and removal of noxious gases including radon gas from the soil proximate a basement or other enclosure to minimize any health hazards. More specifically, it relates to a ventilation apparatus which includes a fan situated outside the enclosure that draws the noxious gas from the soil proximate a basement and dispenses it harmlessly in the atmosphere.

BACKGROUND OF THE INVENTION

Radon gas is a significant health hazard that has recently been recognized as causing up to 20,000 deaths each year in the United States alone. The United States Environmental Protection Agency has estimated that one million to five million homes may have unhealthful radon levels. In non-inhabited areas, radon gas naturally diffuses through the soil into the atmosphere where it is harmlessly dispersed. Wherever there is a house, however, the radon gas leaks into subterranean rooms around the foundation slab and through cracks in the foundation or subterranean walls, and diffuses through porous cement and concrete blocks. And, since radon is heavier than air, the subterranean room acts as a collector of radon gas, holding and concentrating the gas to lethal levels.

The Environmental Protection Agency has published A HOMEOWNER'S GUIDE, August, 1986, OPA-86-005, and TECHNICAL GUIDANCE Manuals, EPA/625/5-86/019 (1st edition) and EPA/625/5-87/019 (2d edition) that outline methods for reducing radon gas concentrations inside subterranean rooms of houses or other structures. While many of the methods for reducing radon gas concentrations described in these pamphlets includes the use of some type of discharge fan, in each case the discharge fan is mounted above the ground level or inside or attached to the house or enclosure.

The placement of a ventilation fan above ground or inside or attached to a house or enclosure may have harmful or distracting side-effects. First, an improperly mounted fan or a fan that is incompletely sealed to a discharge vent may allow re-entrainment of the unwanted noxious gas that the apparatus is designed to disperse. Second, if the fan is mounted outside the enclosure or in an uninsulated location, ice and moisture may build up in the piping network that would have the effect of reducing the suction of the fan. Third, depending on the location of the fan in relation to the piping network, moisture may condense or other debris may enter the fan assembly and cause corrosion or mechanical problems for the fan assembly itself. Finally, from a more cosmetic standpoint, a bulky fan assembly may be mounted in a place that is difficult to access and may be unattractive and very noisy. The EPA pamphlets neither offer solutions to these problems or even suggest the existence of these practical hazards.

SUMMARY OF THE INVENTION

Accordingly, it is an object of the present invention to overcome the limitations and disadvantages of the prior art.

It is another object of the present invention to provide a method and apparatus for subfloor collection and disposal of radon gas.

It is a further object of the present invention to provide a method and apparatus for collecting radon gas from the soil proximate a subterranean enclosure and disposing it harmlessly into the atmosphere.

The present invention overcomes the drawbacks of the previous systems shown in the prior art by mounting the ventilation fan in a sealed container under ground level. The specific underground placement of the fan insulates most of the apparatus, including the piping network and prevents or reduces the potential hazards of above-ground placement of the fan.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

While the invention will be described in connection with a preferred embodiment, it is not intended to limit the invention to that embodiment. On the contrary, all alternatives, modifications and equivalents are to be included within the spirit and scope of the invention as defined by the appended claims.

DESCRIPTION OF THE PREFERRED EMBODIMENT

Figure 1:
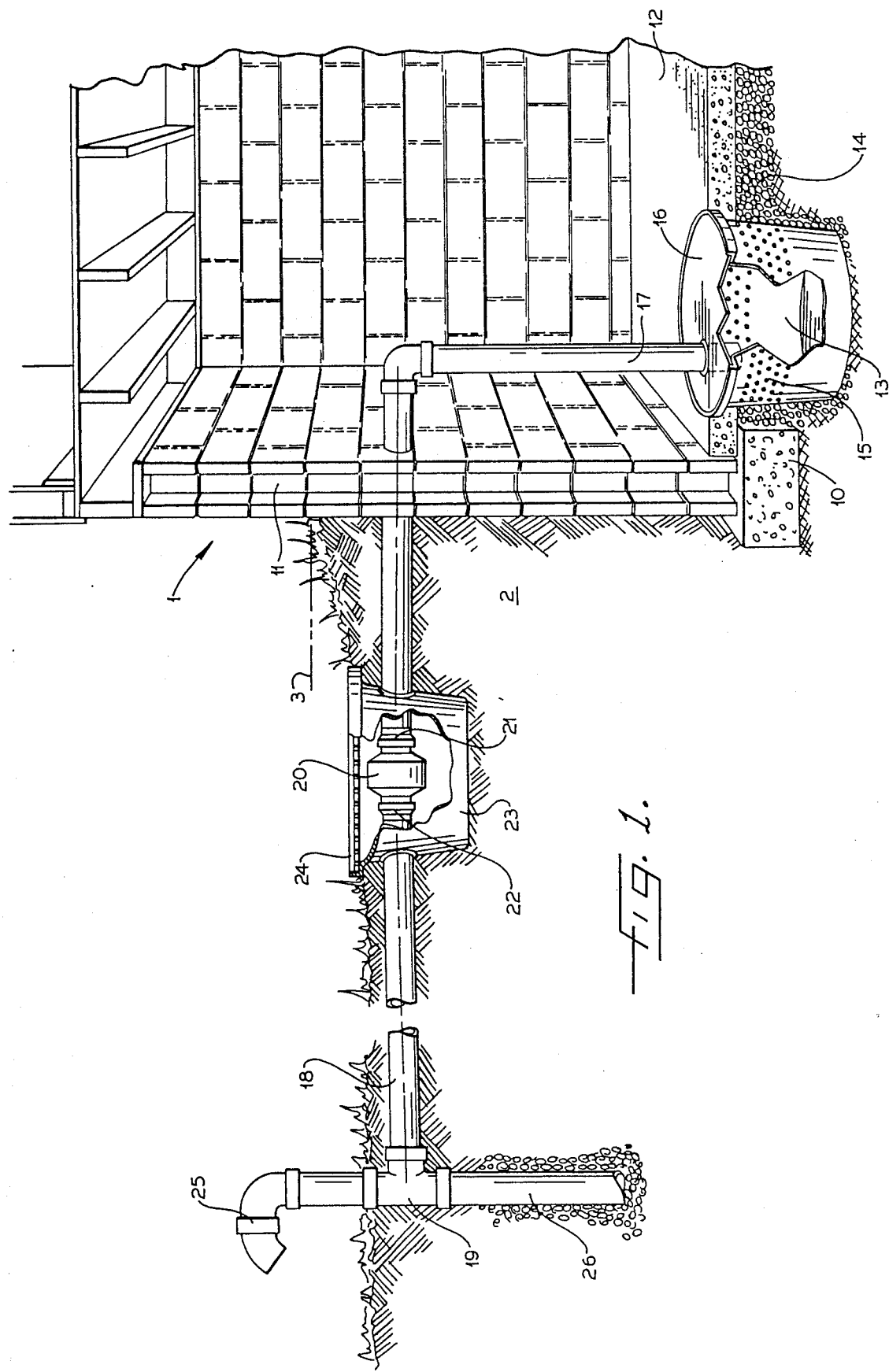
FIG. 1 is a perspective view of a section of a subterranean enclosure including one embodiment of the present invention.

Turning to FIG. 1, the subterranean enclosure 1, such as the basement illustrated in the preferred embodiment, is surrounded by soil 2 through which noxious gases, including radon gas naturally diffuse.

There is shown a foundation footing 10 of concrete or the like which supports a wall, in this case a hollow concrete block wall 11. Four such walls usually define the perimeter of the subterranean enclosure or basement, and two of them are shown in the illustration. The walls extend from the foundation footings on which they rest to at least some level above the top ground level 3. Also resting on the foundation footings is a poured concrete floor slab 12 that forms the floor of the subterranean enclosure. The floor slab usually rests on the foundation footings immediately next to the wall. Preferably, the floor is non-permeable to gas and fluid.

A cup-shaped collection chamber 13 is disposed in an opening formed in the floor 12, and extends below the floor into the soil thereunder. A gas tight seal is maintained between the chamber 13 and floor 12. This collection chamber may also be positioned in a sidewall rather than the floor and extend into the soil adjacent the wall. Preferably, the collection chamber is mounted in gravel 14 beneath the floor thus allowing free movement of fluids and noxious gases through the interstices among the gravel. The collection chamber 13 has perforations 15 in the wall so the inside of the chamber is in communication with zones defined immediately outside the subterranean enclosure, such as the dirt or gravel adjacent the walls or floor. Additionally, the collection chamber may also have perforations in its bottom that allows for the escape of relatively small amounts of moisture. The collection chamber has a top 16 that is impervious to gas, and is normally in its closed position, as shown in FIG. 1, sealed against the wall of the chamber. The top is removable and resealable, thus allowing access to the interior of the chamber to, for instance, clear debris that might clog or prevent the flow of gas into the chamber 13.

A gas venting pipe 17 is in communication with the interior of the collection chamber 13. The gas venting pipe is sealed to and extends upwardly through the top of the collection chamber to a height in the subterranean enclosure that is still below the ground level 3. The pipe 17 then extends through a seal in the basement wall 11 to a fan 20 that is located below the ground level 3. The gas venting pipe 17 is connected to and in communication with the intake end 21 of the fan 20.

The fan 20 is mounted within a sealed container 23 that is positioned substantially below the ground level 3. The top 24 of the sealed container 23 is removable and resealable to allow access to the fan 20 for routine maintenance and repair. Like the collection chamber, the sealed container may have perforations in its bottom to allow moisture to escape from the container. And, also like the collection chamber, the sealed container is mounted in gravel 32. The gas venting pipe 17 enters the container through a seal in the sidewall.

A further gas venting pipe 18 is connected to the exhaust end 22 of the fan 20. This gas venting pipe 18 also extends through a seal in the sidewall of the container, and runs underground from the fan to a "T" 19 in the pipe. The "T" 19 leads to an above ground ventilation or discharge duct 25 and forms a condensation drain 26 so that fluids return harmlessly to the soil.

In the preferred embodiment, the gas venting pipe 17 slopes downwardly from the fan 20 to the collecting means 13. Additionally, the gas vent pipe 18 slopes downwardly from the fan 20 to the "T" 19. This positioning of the pipes 17 and 18 allows for drainage of condensation or fluids away from the fan 20, thus reducing the likelihood of damage to the fan 20. The condensation that drains from the pipe 18 is disposed out the condensation drain 26 that extends below the frost line. Ideally, the condensation drain 26 is mounted in gravel to provide for increased drainage of moisture. Similarly, the ventilation duct 25 preferably faces downward to prevent any moisture or debris from entering the exhaust pipe.

Figure 2:
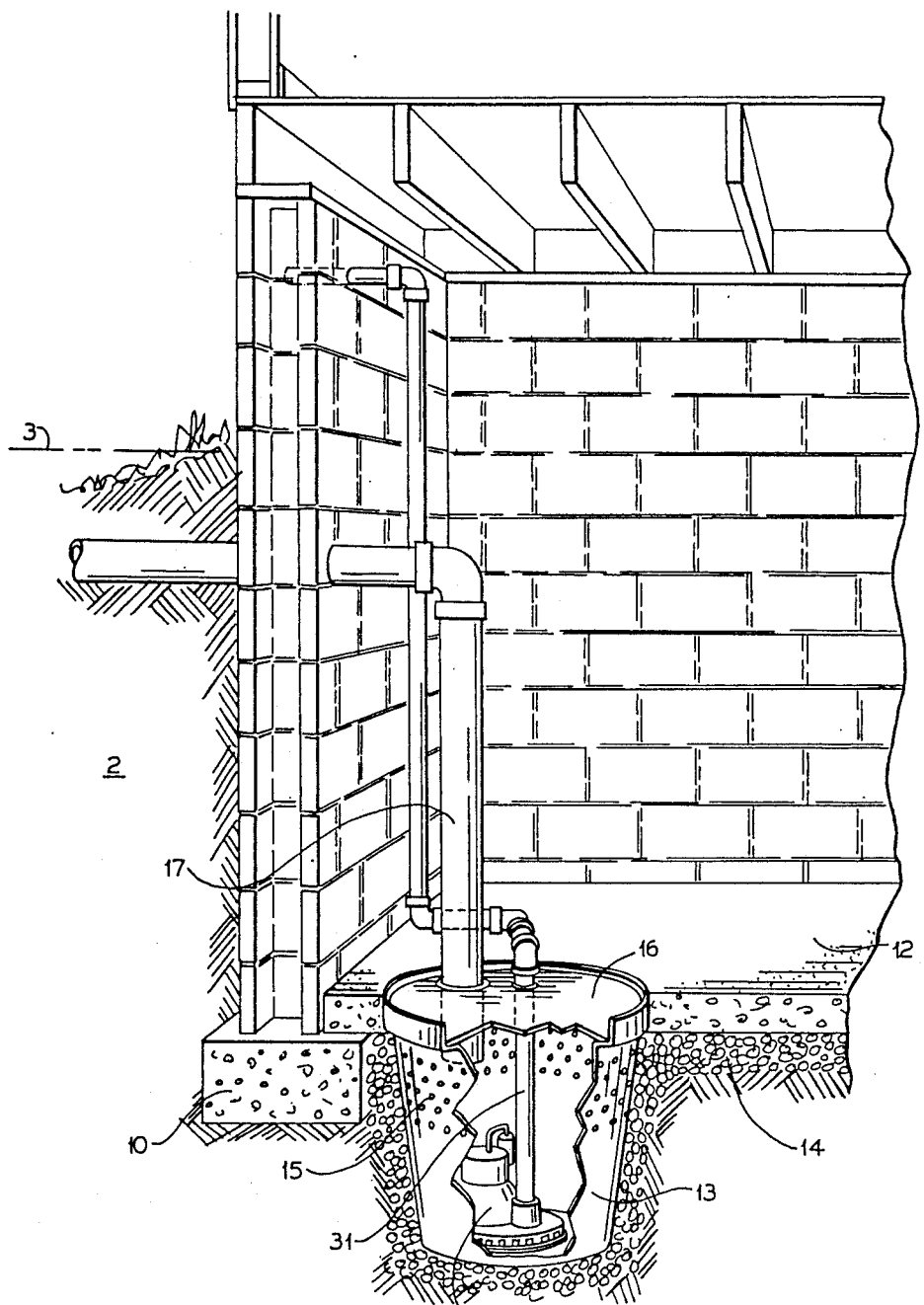
FIG. 2 is a perspective view of an alternate embodiment of one portion of the present invention.

FIG. 2 shows an alternate embodiment of the collecting means 13. Mounted within the collection chamber 13 is a pump 30 for disposing of fluids that may seep into the collecting means. The pump for removing fluid that drains into the collecting means is connected to a fluid removal pipe 31 that passed through an air tight seal in the top of the collection chamber and carries the pumped fluids to the exterior of the enclosure.

In operation, the fan draws a suction through the gas venting pipe, creating a low pressure condition within the collection chamber. Since the chamber is sealed to the floor 12, and the piping is sealed to the chamber, this low pressure also extends through the chamber perforations to the zones outside the enclosure. This low pressure condition draws into the collection chamber noxious gases including radon gas that are in the soil or gravel proximate the enclosure. From here, they are harmlessly exhausted to the atmosphere through the piping.

The invention has been described in detail with particular reference to a preferred embodiment and the operation thereof, but it is understood that variations, modifications, and the substitute of equivalent mechanisms can be affected within the spirit and scope of this invention, particularly in light of the foregoing teachings.

That which is claimed is:

1. An apparatus for collecting gas from the soil proximate a subterranean enclosure and harmlessly dispensing it in the atmosphere comprising collecting means disposed substantially outside the subterranean enclosure comprising a collection chamber having perforations in the walls of the chamber so the inside of the chamber is in communication with zones outside the subterranean enclosure, suction means comprising a fan having an intake end and an exhaust end and a resealable container within which the fan is disposed wherein said sealed container is mounted outside the subterranean enclosure and under ground level, a ventilation duct having one end connected to the exhaust of said suction means and a second end having access to the atmosphere, communication means connecting the inside of the collection chamber to the intake end of the fan thereby generating a suction in the collection chamber so that gas in the soil proximate the enclosure and collection chamber is drawn into the collection chamber, with the suction means pulling it therethrough and dispensing it harmlessly into the atmosphere remote from the enclosure.

2. An apparatus as described in claim 1 wherein the collecting means further comprises a lower portion free of perforations for temporarily retaining water that enters through the perforations and collects in the bottom thereof.

3. An apparatus as described in claim 2 wherein the collecting means further comprises pumping means for removing water that collects in the bottom thereof.

4. An apparatus as described in claim 1 wherein the communication means connecting the collecting means to the intake end of the fan slopes downwardly from the intake end of the fan.

5. An apparatus as described in claim 1 wherein the ventilation duct slopes downwardly from the level of the exhaust end of the fan.

6. An apparatus as described in claim 1 wherein the communication means and ventilation duct slope downwardly from the respective levels of the exhaust and intake ends of the fan.

7. An apparatus as described in claim 1 wherein the ventilation duct further comprises a condensation drain that extends downwardly toward the ground proximate the access to the atmosphere.

8. An apparatus as described in claim 1 wherein the collecting means is disposed beneath the subterranean enclosure to collect gases that arise from soil and tend to collect under a subterranean enclosure.

9. An apparatus as described in claim 1 wherein the collection chamber comprises a cup shaped member having perforations in the sides and a removable, resealable top allowing access to the interior of the chamber.

10. An apparatus as described in claim 1 wherein the sealed container comprises a cup shaped member free of perforations and a removable, resealable top allowing access to the interior of the container.

11. A method for collecting gas from the soil proximate a subterranean enclosure and dispensing it in the atmosphere comprising the steps of
   mounting a collecting means substantially outside the subterranean enclosure, the collecting means comprising a collection chamber having perforations in the walls of the chamber so the inside of the chamber is in communication with zones outside the subterranean enclosure,
   positioning a fan outside the subterranean enclosure and beneath the ground level and positioning communication means underground and in communication with the collecting means,
   drawing subterranean gases into the collecting means by connecting the communication means to the intake end of the fan, and
   dispensing the subterranean gases into the atmosphere.

12. A method as described in claim 11 further comprising the steps of
   collecting subterranean water in the collection means and
   removing the collected water with pumping means.

13. A method as described in claim 11 wherein the communication means slope downwardly from the fan.

14. A method as described in claim 11 wherein the collecting means is mounted beneath the subterranean enclosure to collect gases that arise from soil and tend to collect under a subterranean enclosure.

* * * * *